(12) United States Patent
Thole (10) Patent No.: US 8,074,220 B2
(45) Date of Patent: Dec. 6, 2011

(54) SYSTEM AND METHOD FOR INTERFACING AN APPLICATION TO A DISTRIBUTED TRANSACTION COORDINATOR

(75) Inventor: David J. Thole, Medfield, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1490 days.

(21) Appl. No.: 11/081,968

(22) Filed: Mar. 16, 2005

(65) Prior Publication Data

US 2005/0262182 A1   Nov. 24, 2005

Related U.S. Application Data (60) Provisional application No. 60/573,155, filed on May 21, 2004.

(51) Int. Cl.
*G06F 9/46* (2006.01)
*G06F 7/00* (2006.01)
(52) U.S. Cl. ......... 718/101; 718/104; 707/607; 707/703
(58) Field of Classification Search .................. 718/101, 718/104; 707/103, 607, 703; 717/121; 719/312, 719/316, 328
See application file for complete search history.

(56) References Cited

U.S. PATENT DOCUMENTS

| | | | |
|---|---|---|---|
| 5,680,610 A | 10/1997 | Smith et al. | |
| 5,768,587 A * | 6/1998 | Freund et al. | ................. 718/101 |
| 5,835,766 A | 11/1998 | Iba et al. | ....................... 395/679 |
| 5,923,833 A | 7/1999 | Freund et al. | |
| 6,035,301 A | 3/2000 | Siegel et al. | |
| 6,101,527 A * | 8/2000 | Lejeune et al. | ............... 709/201 |
| 6,115,744 A | 9/2000 | Robins et al. | |
| 6,141,679 A | 10/2000 | Schaefer et al. | |
| 6,157,927 A * | 12/2000 | Schaefer et al. | .......... 707/103 R |
| 6,272,675 B1 | 8/2001 | Schrab et al. | |
| 6,463,456 B1 | 10/2002 | Kan et al. | ....................... 709/201 |
| 6,526,416 B1 | 2/2003 | Long | |
| 6,542,922 B1 * | 4/2003 | Chessell et al. | ............... 709/203 |
| 6,671,704 B1 | 12/2003 | Gondi et al. | |
| 6,721,776 B1 | 4/2004 | Erickson et al. | ............... 709/101 |
| 6,799,188 B2 * | 9/2004 | Weedon | ........................ 707/202 |
| 6,845,384 B2 | 1/2005 | Bamford et al. | |
| 6,889,379 B1 * | 5/2005 | Lindhorst et al. | ............. 719/316 |
| 6,988,099 B2 * | 1/2006 | Wiser et al. | ............................ 1/1 |
| 7,114,148 B2 * | 9/2006 | Irving et al. | ................... 717/121 |

(Continued)

OTHER PUBLICATIONS

"Microsoft Distributed Transaction Coordinator Resource Manager Implementation Guide," Version 6.5, Microsoft Corporation, Jan. 7, 1996, Abstract and Table of Contents (6 pages), pp. 1-161.

(Continued)

*Primary Examiner* — Meng An
*Assistant Examiner* — Tammy Lee
(74) *Attorney, Agent, or Firm* — Pillsbury Winthrop Shaw Pittman LLP (57) ABSTRACT

In certain embodiments, a method for interfacing an application to a distributed transaction coordinator includes receiving a distributed transaction request from an application in a first runtime environment. In response to the request, the application is enlisted with a distributed transaction coordinator in a second runtime environment. The first runtime environment is at least partially distinct from the second runtime environment. A transaction identifier is received from the distributed transaction coordinator. A first resource manager is invoked to enlist in the distributed transaction using the transaction identifier and a second resource manager is invoked to enlist in the distributed transaction using the transaction identifier.

22 Claims, 8 Drawing Sheets

U.S. PATENT DOCUMENTS

| | | | | |
|---|---|---|---|---|
| 7,210,132 | B2* | 4/2007 | Rivard et al. | 717/138 |
| 7,406,692 | B2* | 7/2008 | Halpern et al. | 718/105 |
| 7,454,547 | B1* | 11/2008 | Nallagatla et al. | 710/260 |
| 7,478,408 | B2* | 1/2009 | Sesma | 719/328 |
| 7,496,574 | B2* | 2/2009 | Walker | 707/8 |
| 7,849,464 | B2* | 12/2010 | Somogyi | 718/104 |
| 2002/0087366 | A1* | 7/2002 | Collier et al. | 705/5 |
| 2002/0120917 | A1* | 8/2002 | Abrari et al. | 717/110 |
| 2009/0025009 | A1* | 1/2009 | Brunswig et al. | 719/312 |

OTHER PUBLICATIONS

Jeffrey Richter, *Applied Microsoft .NET Framework Programming*, Microsoft Press, Copyright 2002, Book Cover and copyright information (3 pages), Contents at a Glance (1 page), Table of Contents pp. ix-xv, Introduction pp. xix-xxxii, pp. 1-166, Index 557-591.

Jim Gray and Andreas Reuter, *Transaction Processing: Concepts and Techniques*, Morgan Kaufmann Publishers, Inc., Copyright 1993, Book Cover and copyright information (8 pages), Table of Contents pp. vii-xxi, pp. 3-5, 47, 93, 159-160, 239, 293-295, 375, 449, 493-494, 527-657, 661-662, 751-752, 831-832, 917, Index 1047-1069.

Adam Nathan, *.NET and COM: The Complete Interoperability Guide*, Sams Publishing, Copyright 2002, Book Cover and copyright information (3 pages), Contents at a Glance (2 pages), Table of Contents pp. v-xx, pp. 11-246, 377-423, Index 1497-1579.

* cited by examiner

SYSTEM AND METHOD FOR INTERFACING AN APPLICATION TO A DISTRIBUTED TRANSACTION COORDINATOR

RELATED APPLICATION

This application claims the benefit of U.S. Provisional Application No. 60/573,155 filed May 21, 2004.

TECHNICAL FIELD

This invention relates to distributed transactions and, more particularly, to a system and method for interfacing an application to a distributed transaction coordinator.

BACKGROUND

Transactions may be distributed over multiple database systems and, in these cases, typically comprise a set of actions. These actions are often organized to conform to the following properties: Atomiticity, Consistency, Isolation, and Durability (ACID). More particularly, data changes within a transaction are typically committed together or are rolled back together (atomicity). In the case that a transaction is rolled back, the effected resources are returned to the valid state they were in before the transaction (consistency). Any changes made to data by a transaction are invisible to other concurrent transactions until the transaction commits (isolation). Once a transaction is committed, the changes may persist even in the face of subsequent system failures (durability). In order to provide such features and functions, a two-phase commit protocol may be implemented. For example, the X/Open Distributed Transaction Processing Model describes such a two-phase commit protocol in which the transaction manager requests each enlisted resource manager to prepare to commit and, if all resource managers successfully prepare, broadcast a commit decision. The X/Open DTP XA Specification is a software architecture that allows multiple application programs to share resources provided by multiple resource managers and allows their work to be coordinated into global transaction.

SUMMARY

A system and method for interfacing an application to a distributed transaction coordinator are provided. In one embodiment, the method includes receiving a distributed transaction request from an application in a first runtime environment. In response to the request, the application is enlisted with a distributed transaction coordinator in a second runtime environment. The first runtime environment is at least partially distinct from the second runtime environment. A transaction identifier is received from the distributed transaction coordinator. A first resource manager is invoked to enlist in the distributed transaction using the transaction identifier and a second resource manager is invoked to enlist in the distributed transaction using the transaction identifier. The details of one or more embodiments of the disclosure are set forth in the accompanying drawings and the description below. Particular features, objects, and advantages of the disclosure will be apparent from the description and drawings and from the claims.

DETAILED DESCRIPTION

Figure 1:
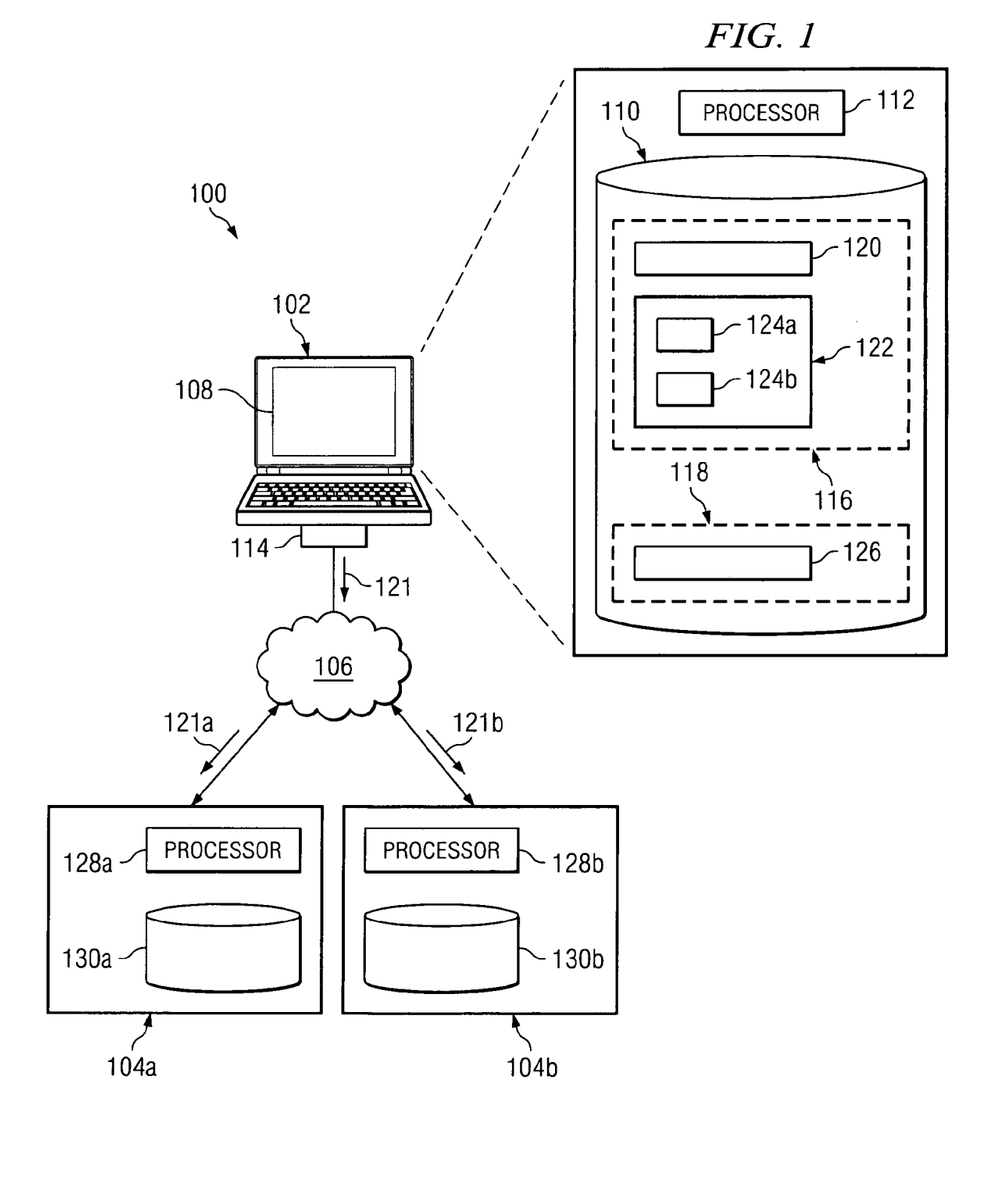
FIG. 1 is a block diagram of a distributed transaction system in accordance with one embodiment of the present invention.

FIG. 1 is a system 100 for facilitating distributed transactions. A distributed transaction is typically a transaction that involves two or more database systems such as, for example, resource managers 104a and 104b. A distributed transaction may also involve other systems such as database management systems, message queues, job queues, packer processors, sniffers, and such. Indeed, distributed transactions may be a request for data or processing from two components or modules residing on the same system. At a high level, system 100 is a client/server environment comprising at least one client 102 and a plurality of communicably coupled resource managers 104 via a network 106, but system 100 may also be a standard computing environment or any other suitable environment. In general, system 100 comprises any system operable to provide a client application 120 in a first runtime environment with an interface to a distributed transaction coordinator (DTC) 126 in a different runtime environment. For example, illustrated system 100 may be a portion of an enterprise system that allows client application 120 in a .NET runtime environment to execute a distributed transaction using DTC 126 running in a C/C++ runtime environment. In this example, the native C/C++ runtime execution threads, control blocks, and other mechanisms used by DTC 126 during the distributed transaction may not be directly compatible with the standard .NET runtime environment. In overcoming this example incompatibility, system 100 may generate new mechanisms (e.g., queues, threads, enlistment objects, semaphores, locks) to interface the communication and exchange of data between the two runtime environments. As a result, client application 120 may participate in distributed transactions managed by DTC 126 that operates in a different runtime environment from application 120.

Client 102 is typically a computer that requests and receives services and information from resource managers 104 via network 106. In the illustrated embodiment, client 102 includes a graphical user interface (GUI) 108, a memory 110, a processor 112, and an interface 114. It will be understood that there may be any number of clients 102 coupled to resource manager 104 or, alternatively, client 102 may comprise a management component of resource manager 104. In general, client 102 may include input devices, output devices, mass-storage media, processors, memory, interfaces, communication ports, or other suitable components for communicating requests to resource manager 104 and receiving responses via network 106. For example, client 102 may comprise a computer that includes an input device, such as a keypad, touch screen, mouse, or other device that can accept information, and an output device that conveys information associated with the operation of resource manager 104 or clients 102, including digital data, visual information, or any other suitable information. Both the input device and output device may include fixed or removable storage media such as magnetic computer disk, CD-ROM, or other suitable media to both receive input from and provide output to users of client 102 through a portion of a data display, namely GUI 108. As used in this document, client 102 is intended to encompass a personal computer, a workstation, network computer, kiosk, wireless data port, personal data assistant (PDA), one or more processors within these or other devices, or any other suitable processing device. The present disclosure contemplates computers other than general purpose computers as well as computers without conventional operation systems.

GUI 108 comprises a graphical user interface operable to allow the user of client 102 to interface with at least a portion of system 100 for any suitable purpose. Generally, GUI 108 provides the user of client 102 with an efficient and user-friendly presentation of data provided by system 100, such as charts and tables. GUI 108 may comprise a plurality of displays having interactive fields, pull-down lists, and buttons operated by the user. It should be understood that the term "graphical user interface" may be used in the singular or in the plural to describe one or more graphic user interfaces in each of the displays of a particular graphical user interface. Further, GUI 108 contemplates any graphical user interface, such as a generic web browser, that processes information in system 100 and efficiently presents the information to the user. Resource manager 104 can accept data from client 102 via the web browser (e.g., Microsoft Internet Explorer or Netscape Navigator) and return the appropriate Hyper Text Markup Language (HTML) or eXtensible Markup Language (XML) responses. In addition, GUI 108 provides an interface with memory 112 for participating in distributed transactions.

Memory 110 may include any memory or database module and may take the form of volatile or non-volatile memory including, for example, magnetic media, optical media, Random Access Memory (RAM), Read Only Memory (ROM), removable media, or any other suitable local or remote memory component. In the illustrated embodiment, memory 110 includes a first runtime environment 116 and a second runtime environment 118. In general, runtime environments 116 and 118 comprises a suite of tools provided to applications during runtime. For example, runtime environments 116 and 118 each often include or execute subroutines, environment variables, or any other suitable element for providing commonly used functions and data to applications during runtime. In certain embodiments, runtime environment 116 and 118 comprise a Common Language Runtime (CLR) and a Common Object Model (COM) environment, respectively, and will be referred to as CLR environment 116 and COM environment 118 hereafter. Of course, these references are for illustration purposes only and are not meant to limit the scope of the disclosure.

COM environment 118 can include any software that provides a software management framework for accommodating software objects. For example, each COM object may include a unique identifier and interfaces allowing applications and other components to access their features and functions. Furthermore, COM objects may be language-independent, have built-in interprocess communications capability, and may be used with an object-oriented program design. In one instance, a COM object may implement methods in a C/C++ runtime library under COM environment 118. It will be understood that COM environment 118 may alternatively comprise a runtime environment that is COM-based, COM compatible, or a runtime environment performing COM-like functions. In the illustrated embodiment, COM environment 118 accommodates DTC 126.

DTC 126 is typically software and may be written or described in any appropriate computer language including, for example, C, C++, Java, J#, Visual Basic, assembler, Perl, any suitable version of 4GL, or any combination thereof. As used herein, software generally includes any appropriate combination of software, firmware, hardware, and/or other logic. In general, DTC 126 is a transaction manager that coordinates distributed transaction across various systems. For example, DTC 126 may comprise a Microsoft Distributed Transaction Coordinator (MSDTC) that coordinates distribute transactions across a network of various Windows operating systems. DTC 126 may represent transactions as an object linked and embedded (OLE) transaction based on the COM. In one example, the OLE transaction model includes OLE transaction object classes and each object class may contain one or more OLE Transaction interfaces. In the MSDTC example, DTC 126 includes at least four interfaces that client application 120 and resource managers 104 may invoke to participate in a distributed transaction. These four interfaces may be implemented by a dynamic link library (DLL) identified as MSDTC proxy (MSDTCPRX.DLL) and may comprise: ITransaction; IDtcToXaHelperSinglePipe; ITransactionEnlistmentAsync; and ITransactionResourceAsync. ITransaction is an interface to a transaction object including methods called by application programs and resource managers to commit or rollback updates to a database. IdtcToXaHelperSinglePipe is an interface that assists in mapping an OLE transaction to an XA transaction. This interface includes at least the following four methods: (1) XARMCreate associates resource managers 104 and DTC 126 and identifies the DLL operable to assist in recovery operations in the event of system failure; (2) ConvertTridToXID that converts a ITransaction identifier to an X/Open XA XID; (3) EnlistWithRM that enlists the resource manager in a distributed transaction; and (4) ReleaseRMCookie that closes the connection between DTC 126 and the resource manager. ITransactionEnlistmentAsync interfaces a resource manager with DTC 126 for notifying DTC 126 when a request has been completed. This interface includes at least the following methods: (1) PrepareRequestDone that notifies DTC 126 that a prepare-to-commit request has been completed; (2) CommitRequestDone that notifies DTC 126 that a commit request has been completed; and (3) AbortRequestDone that notifies DTC 126 that an abort request has been completed. ITransactionResourceAsync is an interface used by DTC 126 to transmit transaction state change request to resource managers 104. This interface includes at least the following interfaces: (1) PrepareRequest that request that a resource manager prepare to commit a transaction; (2) CommitRequest that request that a resource manager commit a transaction; and (3) AbortRequest that request that a resource manager rollback a transaction. It will be understood that these interfaces and methods are for illustrative purposes only and that these, additional, and/or different features and functions may be include in DTC 126—indeed, while not illustrated, DTC 126 may comprise a child or submodule of another software module, such as an operating system or an environment, without departing from the scope of this disclosure. Applications executing in COM environment 118 normally directly interface or are directly coupled with DTC 126. In contrast, exterior applications (e.g., application 120) interface DTC through .NET engine 122.

Turning to CLR environment 116, CLR environment 116 can include any software, hardware, firmware, or a combination thereof that manages the execution of .NET or other COM incompatible program code and provides services for applications during runtime. For example, CLR environment 116 may provide memory and exception thread management, debugging and profiling, security, or other suitable services for .NET applications. As described above, .NET is used for illustrated purposes and this disclosure contemplates any COM-incompatible code, executable, or module. It will be understood that CLR environment 116 may alternatively comprise a runtime environment that is CLR-based, CLR compatible, or is a runtime environment performing CLR-like functions. In the illustrated embodiment, CLR environment 116 manages a client application 120 and .NET engine 122, but may manage any other suitable .NET program or subroutine. Client application 120 is suitable application running on computer 102 that is operable to initiate transactions with resource managers 104, such as distributed transaction 121, and communicably coupled with .NET engine 122. For example, application 120 may comprise a Web-based program, a data management tool, an enterprise application, or any other software application that is operable to receive or transmit information to resource managers 104. Application 120 may be based on any appropriate computer language such as, for example, C#, VB.NET, J#, and other computer languages supported by CLR environment 116. It will be understood that while application 120 is illustrated as a single multitasked module, the features and functionality performed by this engine may be performed by multiple modules. Moreover, application 120 may comprise a child or submodule of another software module, not illustrated, without departing from the scope of this disclosure.

.NET engine 122 can include any software operable to provide an interface between client application 120 and DTC 126. As a result, client application 120 may conduct a distributed transaction employing DTC 126 in another (possibly incompatible) runtime environment, such as COM environment 118. For example, since .NET objects and execution threads may be asynchronous with COM objects and execution threads, .NET engine 122 may be operable to adapt or otherwise interface the objects and execution threads across CLR environment 116 and COM environment 118. In doing so, .NET engine 122 may construct queues, threads, objects, semaphores locks, or any other suitable element for interfacing client application 120 and DTC 126. In the case when DTC 126 comprises an MSDTC, interfaces to DTC 126 may be manually redefined with appropriate data types and attributes in order to call the interfaces in COM environment 118 from CLR environment 116 and may include the following:

```
[DllImport("xolehlp.dll",CallingConvention=CallingConvention.Cdecl)]
    static private extern int XoleHlp_DtcGetTransactionManager(
    [In]
    string Host,
    [In]
    string TmName,
    [In]
    Guid riid,
    [In]
    int dwReserved1,
    [In]
    short wcbReserved2,
    [In]
    IntPtr pvReserved1,
    [Out]
    Out IntPtr pIUknown);
[
    ComImport,
    Guid("47ED4971-53B3-11d1-BBB9-00C04FD658F6"),
    InterfaceType(ComInterfaceType.InterfaceIsIUnknown)
]
```

```
interface IDtcToXaHelperSinglePipe
{
    void XARMCreate(
        [MarshalAs(UnmanagedType.LPStr)]
            string XAOpenInfo,
        [MarshalAs(UnmanagedType.LPStr)]
            string ClientDll,
        [Out]
            out uint RMCookie);
    void ConvertTridToXID(
        [In]
            ITransaction pITransaction,
        [In]
            uint    dwRMCookie,
        [Out][In]
            ref XAXIDStruct xid);
    void EnlistWithRM(
        [In]
            uint          dwRMCookie,
        [In]
            ITransaction       ITransaction,
        [In]
            ITransactionResourceAsync ITransRes,
        [Out, MarshalAs(UnmanagedType.Interface)]
            out ITransactionEnlistmentAsync ITransEnlistment);
    [PreserveSig]
        void ReleaseRMCookie(
            uint RMCookie,
            int fNormal);
} // interface IDtcToXaHelperSinglePipe
[
ComImport,
Guid("0fb15081-af41-11ce-bd2b-204c4f4f5020"),
InterfaceType(ComInterfaceType.InterfaceIsIUnknown)
]
interface ITransactionEnlistmentAsync
{
    void PrepareRequestDone(
        uint hr,
        IntPtr moniker,
        IntPtr boidReason);
    void CommitRequestDone(
        uint hr);
    void AbortRequestDone(
        uint hr);
} // interface ITransactionEnlistmentAsync
} // class DTCEnlistment
[
ComImport,
Guid("69E971F0-23CE-11cf-AD60-00AA00A74CCD"),
InterfaceType(ComInterfaceType.InterfaceIsIUnknown)
]
interface ITransactionResourceAsync
{
    void PrepareRequest(
        int fRetaining,  // should always be false
        uint grfRM,
        int fWantMoniker, // should always be false
        int fSinglePhase);
    void CommitRequest(
        uint grfRM,
        IntPtr /*BOID*/ pNewUOW); // should always be null
                // MS does not marshal BOID correctly
    void AbortRequest(
        IntPtr /*BOID*/ pboidReason,
        int fRetaining,       // should always be false
        IntPtr /*BOID*/ pNewUOW); // should always be null
                // MS does not marshall BOID correctly
    void TMDown( );
} // interface ITransaction/ResourceAsync
```

The above descriptions are for illustration purposes only and any appropriate features and functions may be used in or by .NET engine 122 to provide adjust, modify, and/or convert calls and parameters between CLR environment 116 and COM environment 118.

.NET engine 122 can also include any software operable to enlist client application 120 in a distributed transaction and request resource managers 104 to enlist in the distributed transaction with DTC 126. More particularly, .NET engine 122 may receive a request to enlist client application 120 in a distributed transaction with DTC 126 and, in response to the request, .NET engine 122 may enlist client application 120 with DTC 126 using, for example, the definitions detailed above. In connection with enlisting client application 120 with DTC 126, .NET 120 may also transmit a request to resource managers 104 for enlistment in the distributed transaction with DTC 126. .NET engine 122 may be based on any appropriate computer language such as, for example, C#, VB.NET, J#, and other computer languages supported by or operable to communicate with CLR environment 116. It will be understood that while .NET engine 122 is illustrated as a single multitasked module, the features and functionality performed by this engine may be performed by multiple modules. Moreover, .NET engine 122 may comprise a child or submodule of another software module, not illustrated, without departing from the scope of this disclosure. Indeed, while .NET engine 122 is illustrated as residing in CLR environment 116, .NET engine 122 may reside in COM environment 118 or a third runtime environment (not illustrated) so long as it remains operable to provide an interface between client application 120 and DTC 126. In certain embodiments, .NET engine 122 includes data interfaces 124*a-b* to communicably couple application 120 and one or more resource managers 104.

Each data interface 124 provides an interface between client application 120 and a resource manager 104. For example, data interface 124 may convert, translate, or otherwise modify data, calls, and other elements between formats. A single data interface 124 may provide an interface to a specific type of database resource manager 104 such as, for example, Ingres, Oracle, or others. In another example, data interface 124 provides multiple interfaces, each to a particular database server or database type. Data interface 124 may be based on any appropriate computer language such as, for example, C#, VB.NET, J#, and other computer languages supported by CLR environment 116. It will be understood that while data interface 124 is illustrated as a single multitasked module, the features and functionality performed by this engine may be performed by multiple modules.

Returning to illustrated client 102, processor 112 executes instructions and manipulates data to perform operations of computer 102. For example, processor 112 executes client application 120, .NET engine 122, DTC 126, and other suitable executables or applications. Although FIG. 1 illustrates a single processor 112 in client 102, multiple processors 112 may be used according to particular needs and reference to processor 112 is meant to include multiple processors 112 where applicable.

As appropriate, client 102 generates requests and/or responses and communicates them to another client, server, or other computer systems located in or beyond network 106 such as, for example, resource managers 104. For example, client 102 may receive or transmit data associated with a distributed transaction. Network 106 facilitates wireless or wireline communication between computer system 100 and any other computer. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. Client 102 may include network interface 114 for communicating with other computer systems over network 106 such as, for example, in a client-server or other distributed environment. Generally, interface 114 comprises logic encoded in software and/or hardware in any suitable combination to allow client 102 to communicate with network 106. More specifically, interface 114 may comprise software supporting one or more communications protocols and communications hardware operable to communicate physical signals between client 102 and resource manager 104.

Each resource manager 104 is generally an electronic computing that includes a processor 128 and a database 130. Examples of resource managers 104 include relational databases, object-oriented databases, file systems, document storage systems, message queues, or any other suitable storage system. In the illustrated embodiment, resource managers 104 comprise relational database servers. In one example, resource managers 104 support the X/Open DTP XA Specification, and, as a result, such resource managers 104 can utilize interfaces of an MSDTC-embodiment of DTC 126 that support the XA switch. Each resource manager 104 may be any computer or processing device such as, for example, a blade server, general-purpose personal computer (PC), Macintosh, workstation, Unix-based computer, or any other suitable device. Although FIG. 1 illustrates each resource manager 104*a* and 104*b* as a single server, system 100 can be implemented using computers other than servers, as well as a server pool. Resource manager 104 may be adapted to execute any operating system including Linux, UNIX, Windows Server, or any other suitable operating system. According to one embodiment, resource manager 104 may also be communicably coupled with a web server and/or remote data storage.

Processor 128 executes instructions and manipulates data to perform operations of resource manager 104. Although FIG. 1 illustrates a single processor 128 in resource manager 104, multiple processors 128 may be used according to particular needs, and referenced to processor 128 is meant to include multiple processors 128 where appropriate.

Database 130 may include any memory or database module and may take the form of volatile or non-volatile memory including, without limitation, magnetic media, optical media, RAM, ROM, removable media, or any other suitable local or remote memory component. According to one embodiment, database 130 may comprise a relational database, typically accessed through structured query language (SQL) statements. Relational databases use sets of schemas to describe the tables, columns, and relationships in the tables using basic principles known in the field of database design. Database 130 may also be an object-oriented database, XML documents, Btrieve files, flat files, and/or comma-separated-value (CSV) files, text files, or other data structures or objects.

In one aspect of operation, client application 120 transmits a request to .NET engine 122 to enlist application 120 in a distributed transaction with DTC 126. In response, .NET engine 122 transmits a request to resource managers 104 via network 106 to enlist in the distributed transaction with DTC 126. In addition, .NET engine 122 enlist application 120 with DTC 126 and generates an interface between application 120 and DTC 126. As discussed above, the interface may allow generating threads, queues, locks, and other elements and redefining interfaces to DTC 126. After enlistment, application 120 updates resource managers 104 via distributed transaction 121. Once updated, application 120 transmits a commit request to DTC 126. Based on this request, DTC 126 transmits a prepare to commit request to resource managers 104. After resource managers 104 prepare to commit the request to update data stored in resource managers 104, resource managers 104 notify DTC 126 that their readiness to proceed with those requested updates. After DTC 126 receives notification from the associated resource managers 104, DTC 126 transmits a request to commit those updates to the appropriate resource manager 104. After the updates have been committed, resource managers 104 notify DTC 126 and, in response to the notifications, DTC 126 notifies application 120 that the requested updates have been made to resource managers 104. In the case that any aspect of this two-step process fails, DTC 126 may transmit an abort request in order to rollback any updates to resource managers 104 and notify application 120 of the failure through .NET 122.

FIGS. 2-7 are exemplary flow diagrams illustrating methods for facilitating a distributed transaction. These methods are described with respect to system 100 of FIG. 1, but these methods could also be used by any other system. Moreover, system 100 may use any other suitable technique for performing these tasks. Thus, many of the steps in this flowchart may take place simultaneously and/or in different orders as shown. Moreover, system 100 may use methods with additional steps, fewer steps, and/or different steps, so long as the methods remained appropriate.

Figure 2:
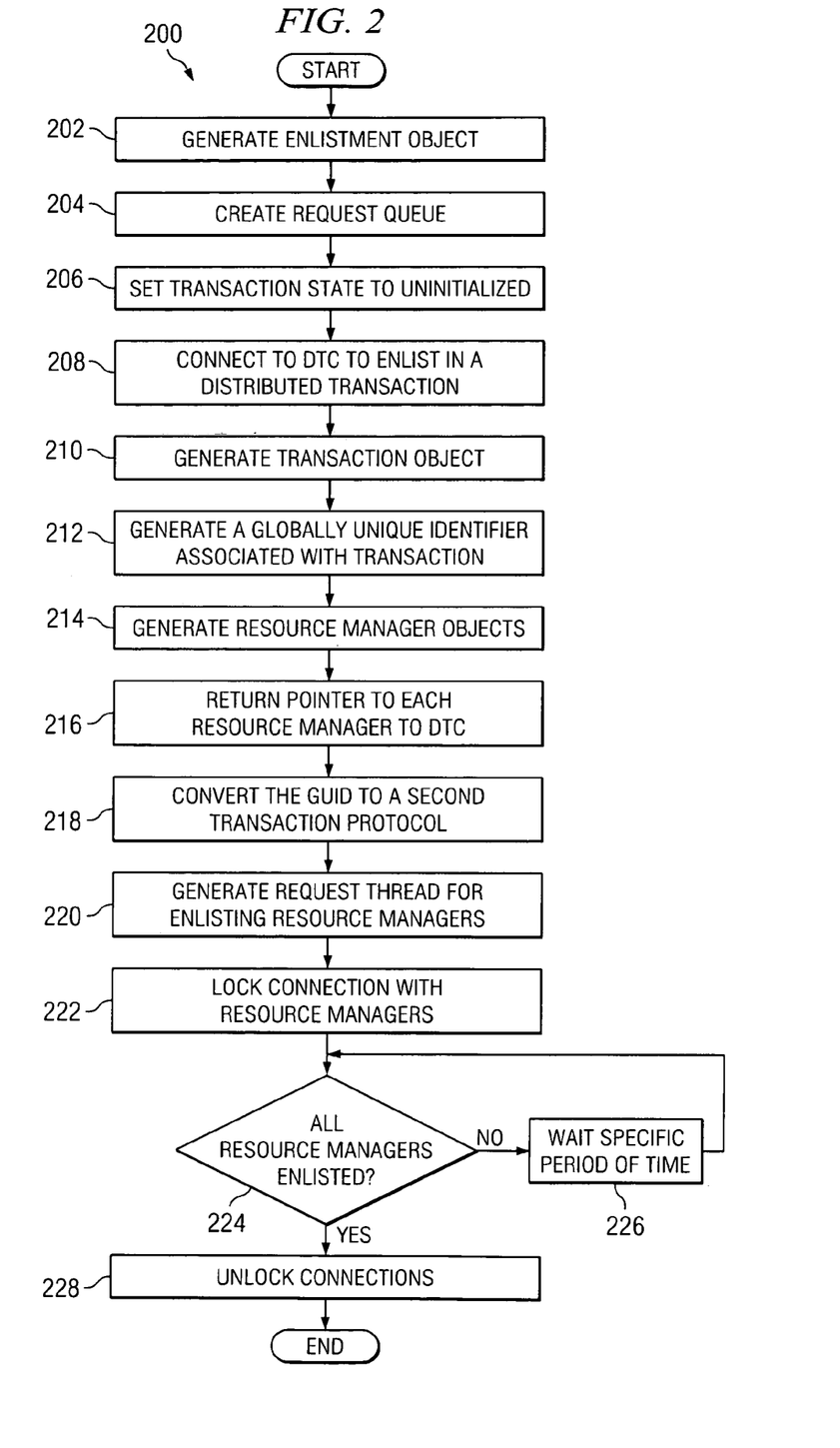
FIG. 2 illustrates a flow diagram implementing an example method for enlisting in a distributed transaction.

FIG. 2 is an exemplary flow diagram illustrating a method 200 for enlisting application 120 and resource managers 104 in a distributed transaction. For each resource manager 104, application 120 may use method 200 (or other similar technique) to enlist the resource manager 104 in the distributed transaction. Method 200 begins at step 202 where .NET engine 122 generate an enlistment object. In the MSDTC example, .NET engine 122 instantiates the DTCEnlistment class defined above to generate an enlistment object and also sets the ClassInterfaceType to None in order to make the object callable from DTC 126 in COM environment 118. In addition, the DTCEnlistment class is also defined as implementing the ITransactionResourceAsync interface thereby allowing the enlistment object to be passed to DTC 126 and receive callbacks from DTC 126. Next, at step 204, a request queue for DTC 126 is created. .NET engine 122 sets the transaction state of the enlistment object to uninitialized at step 206. In the MSDTC example, the Transaction parameter is set to null. At step 208, the enlistment object connects with DTC 126 to enlist application 120 and resource managers 104 in a distributed transaction. The XATM's Single Pipe Helper interface assists in enlistment in MSDTC using the XA protocol. In response, at step 210, DTC 126 generates a transaction object, which represents the distributed transaction. Returning to the MSDTC example, the enlistment object locates and creates an instance of MSDtcTransactionManager to generate a transaction object. During the course of generating the transaction object, DTC 126 generates a globally unique identifier (GUID) operable to identify the transaction across system 100 at step 212. Next, at step 214, DTC 126 generates resource manager objects for each resource manager 104 participating in the transaction. In the MSDTC example, an XARMCreate method of the IdtcToXaHelperSinglePipe interface invokes the MS DTC proxy to create the resource manager objects. Next, at step 216, pointers to the resource manager objects are returned to DTC 126 allowing DTC 126 to reconnect to resource managers 104 in the event that a transaction fails. The XARMCreate method returns this pointer to DTC 126 and RMCookie is set to the value of the pointer.

At step 218, the GUID is converted to a second transaction protocol that is compatible with resource managers 104. In the MSDTC example, the method ConvertTridtoXID is invoked to convert the GUID to an XID and return it to the DTC 126. A request thread for enlisting resource managers 104 is generated at step 220. Next, at step 222, the connection with resource managers 104 is locked to block the application thread until enlistment of resource managers 104 is complete. If the enlistment of resource managers 104 is not complete at decisional step 224, then, at step 226, DTC 126 waits for a period of time. Once the enlistment of resource managers 104 is complete at decisional step 224, then, at step 228, DTC 126 unlocks the connection with resource managers 104, thereby allowing calls to resource managers 104 to start a distributed transaction.

Figure 3:
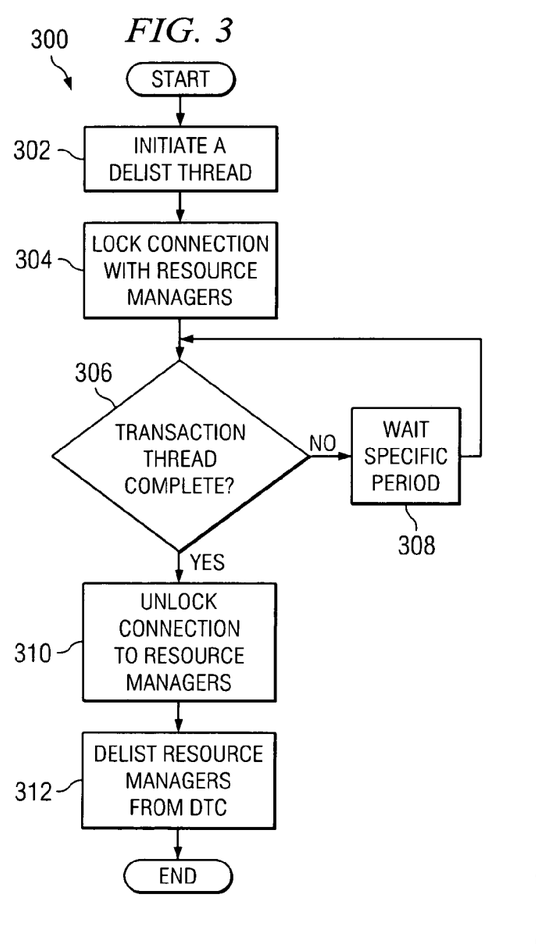
FIG. 3 illustrates a flow diagram implementing an example method for delisting in a distributed transaction.

FIG. 3 is a flow diagram illustrating an example method 300 for delisting application 120 and resource managers 104 from DTC 126. Method 300 begins at step 302 where application 120 initiates a delist thread. For example, application 120 may call engine 122 to invoke the DTCEnlistment's Delist method. At step 304, engine 122 locks the connection with resource managers 104. Regarding the MSDTC example, the TxResourceAsyncThread thread is locked before the delist thread starts allowing the prepare/commit thread under TxResourceAsyncThread to complete before the delist thread. If the transaction thread is not complete at decisional step 306, then, at step 308, engine 122 waits a specified period. Once the transaction thread is complete is complete at decisional step 306, then, at step 310, engine 122 unlocks the connections with resource managers 104. Next, at step 312, resource managers 104 are delisted from DTC 126. For example, StartMSDTCRequest(DELIST) will remove the connections to DTC 126 and set RMCookie to 0.

Figure 4:
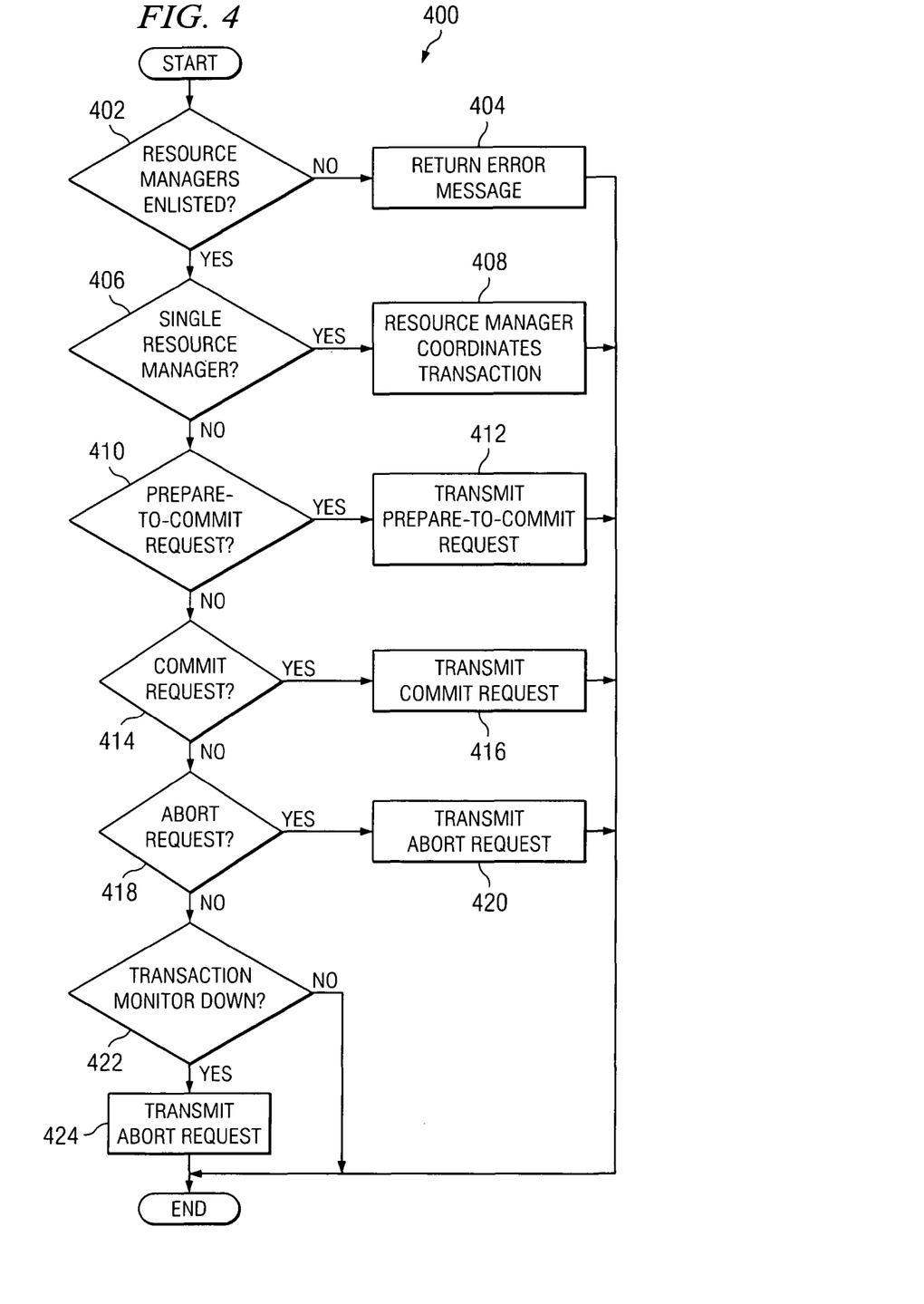
FIG. 4 illustrates a flow diagram implementing an example method for transmitting a request from a request queue.

FIG. 4 is a flow diagram illustrating an example method 400 for transmitting a request from the request queue. In the MSDTC example, the illustrated flow diagram illustrates request invoked through the ITransactionResourceAsync interface. The ITransactionResourceAsync interface is implemented by the DTCEnlistment object and may be passed to MSDTC when the DTCEnlistment object enlist with MSDTC using the IDtcToXaHelperSinglePipe.EnlistmentWithRM method. To begin an asynchronous transaction with resource managers 104, the MSDTC Proxy should complete one of the following request as quickly as possible so DTC 126 may begin other transaction work such as, for example, PrepareRequest( ), CommittRequest( ), AbortRequest( ), and TMDown( ). Method 400 begins at decisional step 402. If a resources manager 104 involved in the associated distributed transaction is not enlisted with DTC 126 at decisional step 402, then, at step 404, an error message is returned to application 120. If all resource managers 104 involved in the associated distributed transaction are enlisted with DTC 126 at decisional step 402, then execution proceeds to decisional step 406. If a is single resource manager 104 is involved in the distributed transaction at decisional step 406, then, at step 408, DTC 126 transmits a request to the single resource manager 104 to coordinate the transaction. For an MSDTC, DTC 126 transmits an indication to the single resource manager 104 indicating that it has the option to perform a single phase optimization. If the resource manager 104 selects this option, then the single resource manager 104 provides the XACT_S_SINGLEPHASE flag to DTC 126. If a single resource manager 104 is not involved in the distributed transaction at decisional step 406, then execution proceeds to decisional step 410. If the request is a prepare-to-commit request, then, at step 412, a prepare-to-commit request is transmitted to resource managers 104. If an indication is received that the associated resource manager 104 is prepared to commit, then the server may stop further database work and be ready to commit or rollback the associated transaction in hot or cold recovery. If the request is not a prepareto-commit request at decisional step 410, then execution proceeds to decisional step 414. If the request is a commit request, then, at step 416, a commit request is transmitted to resource managers 104. If the request is not a commit request decisional step 414, then execution proceeds to decisional step 418. If the request is an abort request, then, at step 420, an abort request is transmitted to resource managers 104. If the request is not an abort request at decisional step 418, then execution proceeds to decisional step 422. In this case, the request notifies the loss of the ability to monitor the transaction, and, at step 424, DTC 126 transmits an abort request to resource managers 104. Otherwise execution ends.

Figure 5:
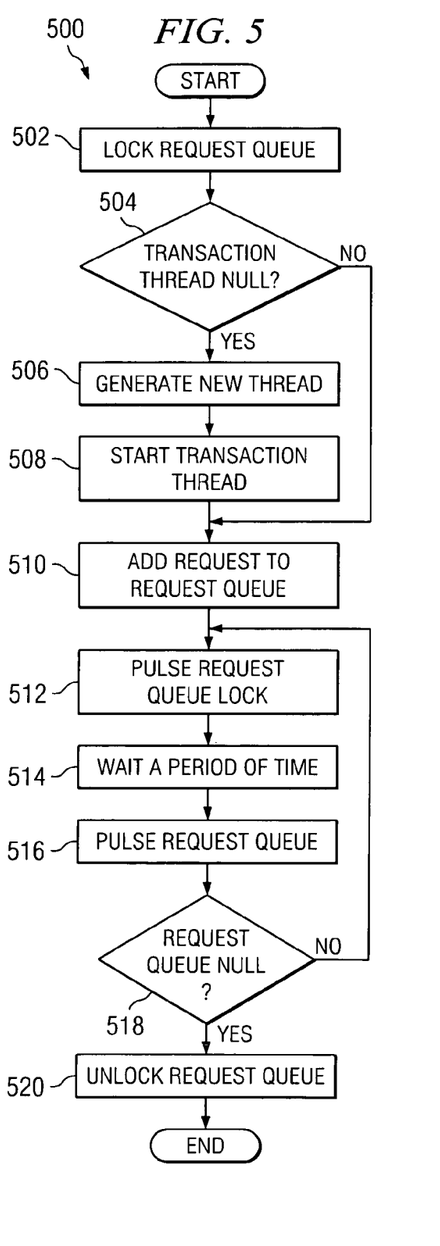
FIG. 5 illustrates a flow diagram implementing an example method for managing a request in a request queue.

FIG. 5 is a flow diagram illustrating an example method 500 for managing requests in the request queue. Method 500 begins at step 502 where engine 122 locks the request queue. If a transaction thread does not exist at decisional step 504, then, at step 506 and 508, .NET engine 122 generates and starts, respectively, a new transaction thread and proceeds to step 510. If a transaction thread does exist at decisional step 504, then, at step 510, the transaction request is added to the request queue. In a FIFO queue, the request is added to the end of the queue. Next, at step 512, engine 122 pulses the request queue to unlock the request queue for the transaction thread. At step 514, engine 122 waits a period of time to allow the transaction thread to process the request from the queue. Engine 122 then pulses the request queue to lock the queue at step 516. If the request queue is not null at decisional step 518, then execution returns to step 512. If the request queue is null at decisional step 518, then, at step 520, engine 122 unlocks the request queue.

Figure 6A:
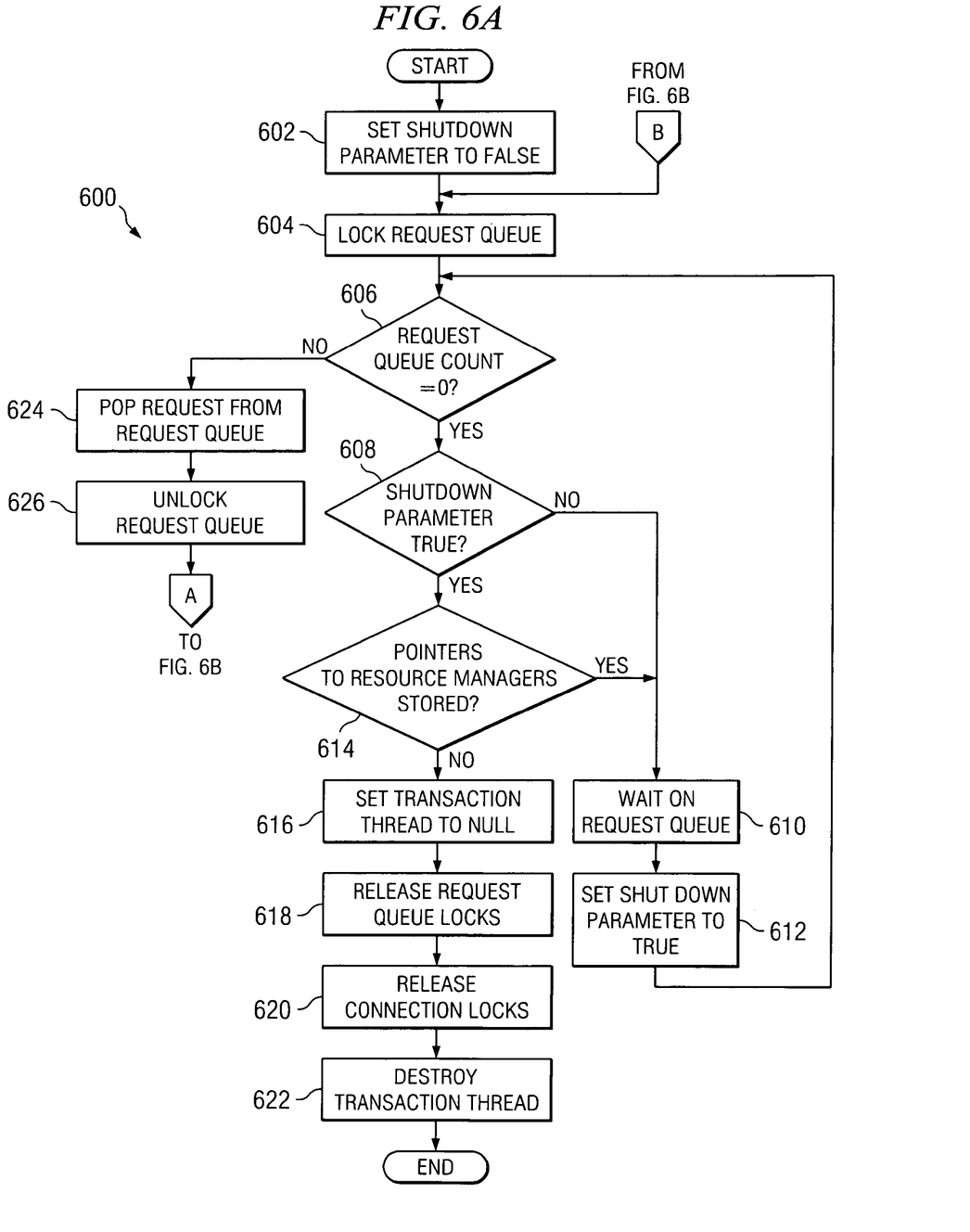
FIGS. 6A-B illustrate a flow diagram implementing an example method for managing an application thread.
Figure 6B:
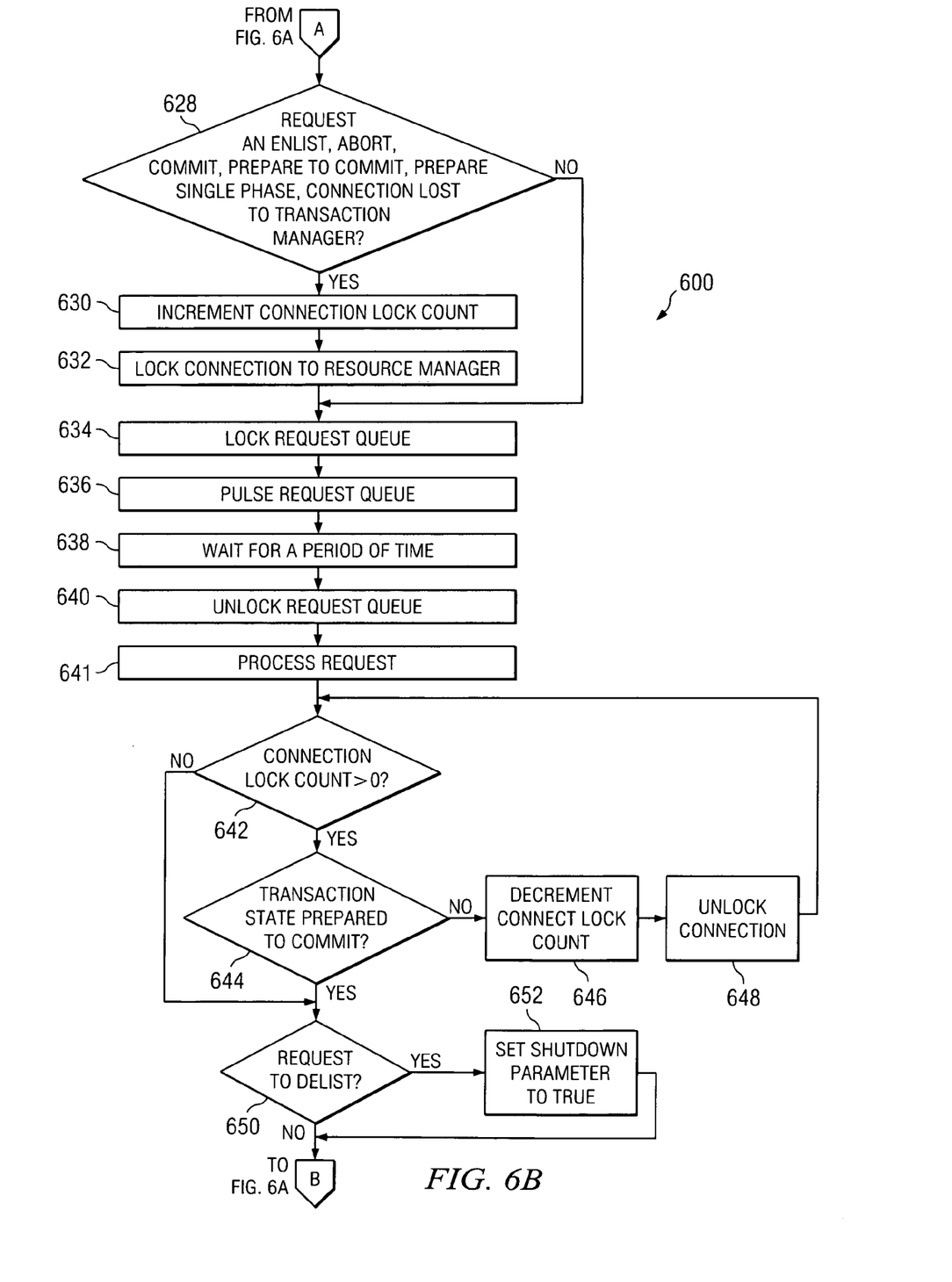

FIGS. 6A-B are flow diagrams illustrating an example method 600 detailing how engine 122 manages an application thread. Method 600 begins at step 602 where engine 122 sets a shutdown parameter of an application thread to false. Next, at step 604, engine 122 locks the request queue. If the request queue count is zero at decisional step 606, then execution proceeds to decisional step 608. If the shutdown parameter is false at decisional step 608, then, at step 610, engine 122 waits for a period of time on request queue. Next, at step 612, engine 122 sets the shutdown parameter to true, and execution returns to decisional step 606. Returning to decisional step 608, if the shutdown parameter is true, then execution proceeds to decisional step 614. If pointers to resource managers 104 are stored at decisional step 614, then execution proceeds to step 610. If pointers to resource managers 104 are not stored at decisional step 614, then the transaction thread is set to null at step 616. Next, at step 618, engine 122 releases the request queue lock. At step 620, engine 122 releases connections to resource managers 104. Engine 122 destroys the transaction thread at step 622.

Returning to decisional step 606, if the request queue count is not equal to zero, then, at step 624, the transaction thread pops the next request from the request queue. Next, at step 626, engine 122 unlocks the request queue. If the request is one of the following at decisional step 628: enlist, abort, commit, prepare to commit, prepare single phase, or connection lost to transaction manager, then, at step 630, engine 122 increments a connection lock count. Next, at step 632, engine 122 locks connections between DTC 126 and resource managers 104. If the request is not one of the identified request at decisional step 628, then, at step 634, engine 122 locks the request queue. Next, at step 636, engine 122 pulses the request queue to unlock the queue for the transaction thread. At step 638, engine 122 waits for a period of time to allow the transaction thread to process the request from the queue using, for example, method 700. The request queue is unlocked at step 640 and the request is processed at step 641. If the connection lock count is greater than zero at decisional step 642, then execution proceeds to decisional step 644. If the transaction state of resource managers 104 is not prepared to commit at decisional step 644, then, at step 646, the connection lock count is decremented at step 646. Next, at step 648, engine 122 unlocks the connections to resource managers at step 648. If the connection lock count is equal to zero at decisional step 642, then execution proceeds to decisional step 650. If the request is not a request to delist application 120, then execution returns to step 604. If the request is a request to delist application 120, then, at step 652, the shutdown parameter is set to true, then execution returns to step 604.

Figure 7A:
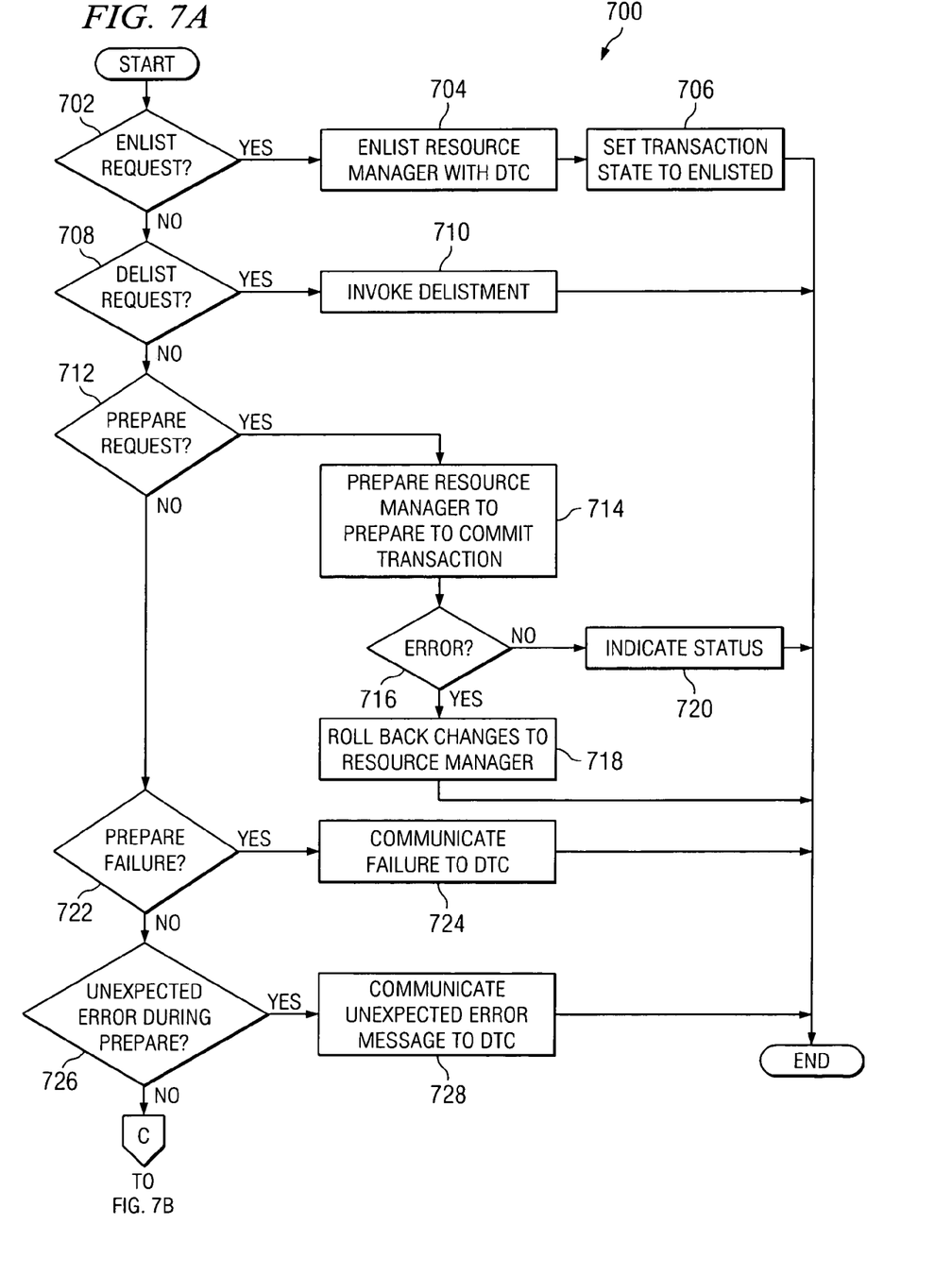
FIGS. 7A-B illustrate a flow diagram implementing an example method for processing a request in a transaction thread.
Figure 7B:
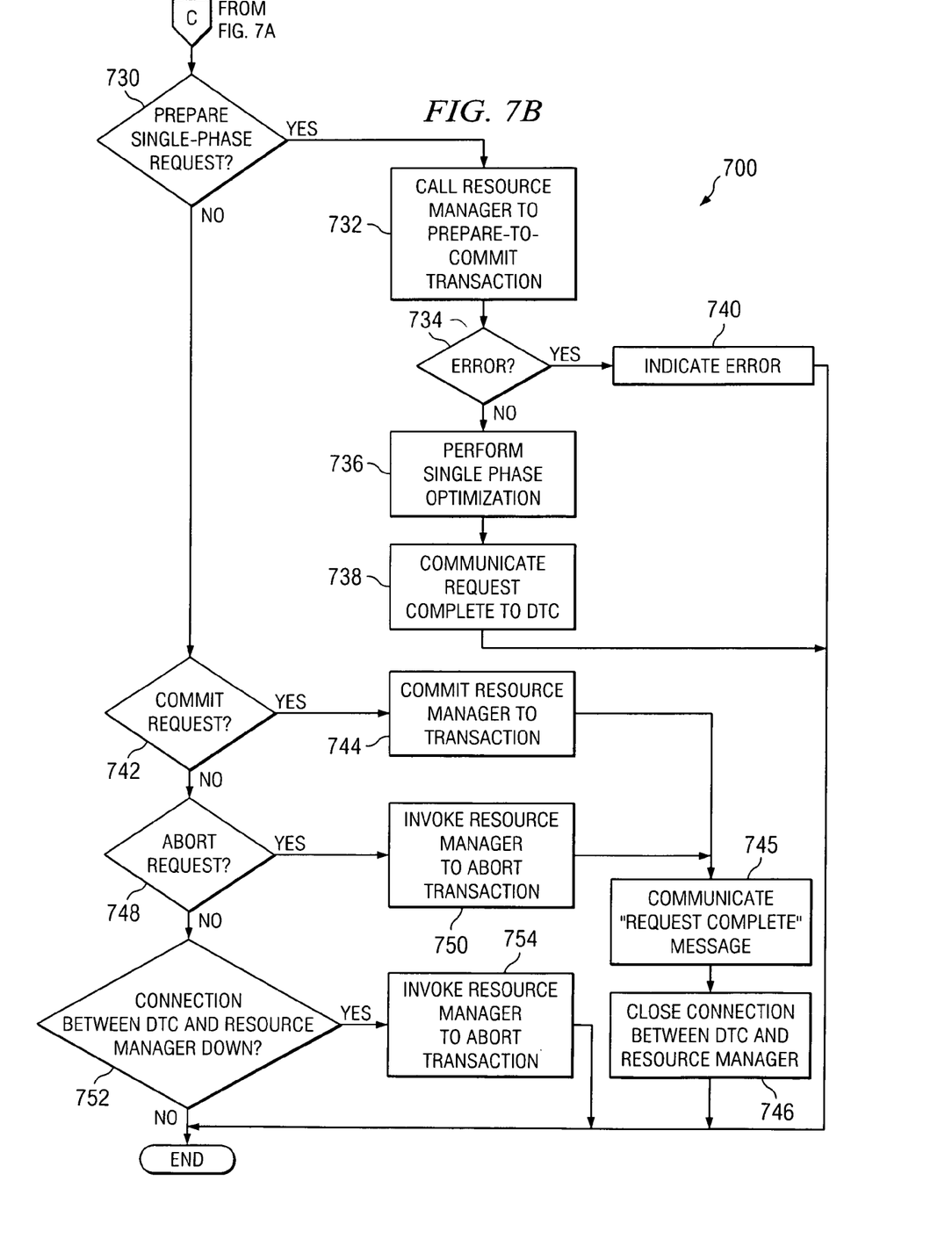

FIGS. 7A-B are flow diagrams illustrating method 700 detailing how a request in a transaction thread may be processed. Method 700 begins at decisional step 702. If the request is to enlist a resource manager 104, then, at step 704, the transaction thread invokes DTC 126 to enlist the resource manager 104. Next, at step 706, the transactions state associated with the resource manager 104 is set to enlisted. If the request is not an enlist request, execution proceeds to decisional step 708. If the request is a delist request, then, at step 710, the transaction thread invokes DTC 126 to delist application 120 and resource managers 104 from DTC 126. If the request is not a delist request at decisional step 708, then execution proceeds to decisional step 712. If the request is a prepare-to-commit request, then, at step 714, the transaction thread calls resource managers 104 to prepare-to-commit the transaction. If an error is identified at decisional step 716, then, at step 718, the resource managers 104 rollback changes made to their associated databases 130. If no errors are identified at decisional step 716, then, at step 720, the transaction thread transmits an indication that the resource managers 104 are prepared to commit.

Returning to decisional step 712, if the request is not a prepare-to-commit request, then execution proceeds to decisional step 722. If the request indicates a failure in preparing to commit the transaction, then, at step 724, the failure is communicated to DTC 126. If the request does not indicates a failure in preparing to commit the transaction, then execution proceeds to decisional step 726. If the request indicates that an unexpected error in preparing to commit the transaction, an indication of this error is communicated to DTC 126 at step 728. If the request does not indicate an unexpected error at decisional step 726, execution proceeds to decisional step 730. If the request is to prepare single-phase optimization, then, at step 732, the application thread transmit a request to prepare to commit the transaction. If not errors are identified at decisional step 734, then, at step 736, the single resource manager 104 performs the single phase optimization. Next, at step 738, an indication of the single phase optimization is communicated to DTC 126. If an error is identified at decisional step 734, then, at step 740, an indication of the error is communicated to DTC 126.

Returning to decisional step 730, if the request is not to prepare single-phase optimization, then execution proceeds to decisional step 742. If the request is a request to commit a transaction, then, at step 744, a request to commit to the transaction is transmitted to resource managers 104. Next, at step 745, a "request complete" message is communicated to, for example, DTC 126 and the connections between resource managers 104 and DTC 126 are closed at step 746. If the request is not to commit to the transaction at decisional step 742, then execution proceeds to decisional step 748. If the request is to abort the transaction, then, at step 750, an abort request is transmitted to the resource managers 104. Then, as described above at step 745, a "request complete" message is communicated to DTC 126 and the connections between resource managers 104 and DTC 126 are closed at step 746. If the request is not an abort request at decisional step 748, then execution proceeds to decisional step 752. If the connection between DTC 126 and a resource manager 104 is down or otherwise lost at decisional step 752, then a request to abort the transaction is transmitted to resource managers 104 at step 754. Otherwise, if the connection between DTC 126 and all resource managers 104 have been maintained at decisional step 752, then this example execution ends.

Although this disclosure has been described in terms of certain embodiments and generally associated methods, alternatives and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A tangible medium having computer-readable instructions thereon for performing a method for managing distributed transactions, the instructions operable to configure one or more processors to:
   receive, from an application in a first runtime environment, a distributed transaction request to perform a distributed transaction using a distributed transaction coordinator in a second runtime environment, the first runtime environment at least partially distinct from the second runtime environment;
   in response to the request, generate an interface between the first and second environments to modify or convert at least one of data or a function related to the distributed transaction exchanged between the first and second environments, and associate the application with the distributed transaction coordinator using the interface;
   generate, by the distributed transaction coordinator, a transaction identifier for the distributed transaction;
   invoke a first resource manager to enlist with the distributed transaction coordinator and perform a first portion of the distributed transaction using the transaction identifier;
   invoke a second resource manager to enlist with the distributed transaction coordinator and perform a second portion of the distributed transaction using the transaction identifier;
   lock connections between the distributed transaction coordinator and each of the first and second resource managers until enlistment of both the first and second resource managers with the distributed transaction coordinator is complete; and
   unlock the connections between the distributed transaction coordinator and each of the first and second resource managers after the first resource manager and the second resource manager are enlisted with the distributed transaction coordinator, wherein the first resource manager performs the first portion of the distributed transaction and the second resource manager performs the second portion of the distributed transaction after the enlistment of both the first and second resource managers is complete.

2. The medium having the instructions of claim 1, wherein the application is communicably coupled to the distributed transaction coordinator.

3. The medium having the instructions of claim 1, wherein the instructions when executed are further operable to configure one or more processors to generate at least one of a queue, a thread, an enlistment object, a semaphore, or a lock for generating the interface between the first and second runtime environments.

4. The medium having the instructions of claim 1, wherein the first runtime environment comprises a Common Language Runtime environment or a .NET environment.

5. The medium having the instructions of claim 4, wherein the second runtime environment comprises a Common Object Model environment.

6. The medium having the instructions of claim 1, wherein the first portion of the distributed transaction is sent from the distributed transaction coordinator to the first resource manager.

7. The medium having the instructions of claim 6, wherein the second portion of the distributed transaction is sent from the distributed transaction coordinator to the second resource manager.

8. The medium having the instructions of claim 1, wherein the instructions when executed are further operable to configure one or more processors to invoke a first interface and a second interface in the first runtime environment, each interface associated with the distributed transaction coordinator; and
   wherein the first interface is configured to:
      convert the transaction identifier to an X/Open XA XID of the X/Open DTP XA Specification; and
      convert OLE transactions to XA transactions; and
   the second interface is configured to transmit transaction state changes to the first and second resource managers, each transaction state changes including at least one of a prepare-to-commit request, a commit request, or an abort request.

9. The medium having the instructions of claim 1, wherein the instructions when executed are further operable to configure one or more processors to encapsulate the transaction identified in an object, the object including the transaction identifier, a portion of the transaction, and a network address associated with the distributed transaction coordinator.

10. A system for managing distributed transactions, comprising:
    memory that stores a first runtime environment and a second runtime environment, the first runtime environment at least partially distinct from the second runtime environment; and
    one or more processors configured to:
       receive, from an application in the first runtime environment, a distributed transaction request to perform a distributed transaction using a distributed transaction coordinator in the second runtime environment;
       in response to the request, generate an interface between the first and second environments to modify or convert at least one of data or a function related to the distributed transaction exchanged between the first and second environments, and associate the application with the distributed transaction coordinator using the interface;
       generate, by the distributed transaction coordinator, a transaction identifier for the distributed transaction;
       invoke a first resource manager to enlist with the distributed transaction coordinator and perform a first portion of the distributed transaction using the transaction identifier;
       invoke a second resource manager to enlist with the distributed transaction coordinator and perform a second portion of the distributed transaction using the transaction identifier;

lock connections between the distributed transaction coordinator and each of the first and second resource managers until enlistment of both the first and second resource managers with the distributed transaction coordinator is complete; and unlock the connections between the distributed transaction coordinator and each of the first and second resource managers after the first resource manager and the second resource manager are enlisted with the distributed transaction coordinator, wherein the first resource manager performs the first portion of the distributed transaction and the second resource manager performs the second portion of the distributed transaction after the enlistment of both the first and second resource managers is complete.

11. The system of claim 10, wherein the application is communicably coupled to the distributed transaction coordinator.

12. The system of claim 10, wherein the one or more processors are further configured to generate at least one of a queue, a thread, an enlistment object, a semaphore, or a lock for generating the interface between the first and second runtime environments.

13. The system of claim 10, wherein the first runtime environment comprises a Common Language Runtime environment or a .NET environment.

14. The system of claim 10, wherein the first portion of the transaction is sent from the distributed transaction coordinator to the first resource manager.

15. The system of claim 10, wherein the one or more processors are further configured to invoke a first interface and a second interface, each interface associated with the distributed transaction coordinator and the first interface configured to:
  convert the transaction identifier to an X/Open XA XID of the X/Open DTP XA Specification; and
  convert OLE transactions to XA transactions; and
the second interface configured to transmit transaction state changes to the first and second resource managers, each transaction state changes including at least one of a prepare-to-commit request, a commit request, or an abort request.

16. The system of claim 10, wherein the one or more processors are further configured to encapsulate the transaction identified in an object, the object including the transaction identifier, a portion of the transaction, and network address associated with the distributed transaction coordinator.

17. A method for managing distributed transaction, the method being executed by one of more processors configured to perform a plurality of operations comprising:

receiving, from an application in a first runtime environment, a distributed transaction request to perform a distributed transaction using a distributed transaction coordinator in a second runtime environment, the first runtime environment at least partially distinct from the second runtime environment;

in response to the request, generating an interface between the first and second environments to modify or convert at least one of data or a function related to the distributed transaction exchanged between the first and second environments, and associating the application with the distributed transaction coordinator using the interface;

generating, by the distributed transaction coordinator, a transaction identifier for the distributed transaction;

invoking a first resource manager to enlist with the distributed transaction coordinator and perform a first portion of the distributed transaction using the transaction identifier;

invoking a second resource manager to enlist with the distributed transaction coordinator and perform a second portion of the distributed transaction using the transaction identifier;

locking connections between the distributed transaction coordinator and each of the first and second resource managers until enlistment of both the first and second resource managers with the distributed transaction coordinator is complete; and unlocking the connections between the distributed transaction coordinator and each of the first and second resource managers after the first resource manager and the second resource manager are enlisted with the distributed transaction coordinator, wherein the first resource manager performs the first portion of the distributed transaction and the second resource manager performs the second portion of the distributed transaction after the enlistment of both the first and second resource managers is complete.

18. The method of claim 17, wherein the application is communicably coupled to the distributed transaction coordinator.

19. The method of claim 17, the plurality of operations further comprising generating at least one of a queue, a thread, an enlistment object, a semaphore, or a lock for generating the interface between the first and second runtime environments.

20. The method of claim 17, wherein the second runtime environment comprises a Common Object Model environment.

21. The method of claim 17, the plurality of operations further comprising invoking a first interface and a second interface in the first runtime environment, each interface associated with the distributed transaction coordinator and wherein the first interface is configured to:
  convert the transaction identifier to an X/Open XA XID of the X/Open DTP XA Specification; and
  convert OLE transactions to XA transactions; and
the second interface is configured to transmit transaction state changes to the first and second resource managers, each transaction state changes including at least one of a prepare-to-commit request, a commit request, or an abort request.

22. The method of claim 17, the plurality of operations further comprising encapsulating the transaction identified in an object, the object comprising the transaction identifier, a portion of the transaction, and network address associated with the distributed transaction coordinator.

* * * * *